Patented Mar. 3, 1953

2,630,414

UNITED STATES PATENT OFFICE 2,630,414

PROTEIN-AROMATIC AMINE-ALDEHYDE REACTION PRODUCTS

George C. Stoecker, Chicago, and Havard L. Keil, Clarendon Hills, Ill., assignors to Armour and Company, Chicago, Ill., a corporation of Illinois No Drawing. Application July 30, 1949, Serial No. 107,832

15 Claims. (Cl. 260—6)

This invention relates to protein derivatives and methods for their preparation. More particularly it deals with resinous protein derivatives which have high water resistance or which may be formed as thermoplastic materials.

Proteins and particularly animal proteins such as blood, hide scraps, etc. have long been used in the manufacture of glue and other adhesives but the proteinaceous products are usually not as water resistant as desirable. Accordingly, it is an object of this invention to provide protein derivative products which do have the desired water resistance.

Also, it is desired to prepare from proteins, products which are thermoplastic, which can be formed into shapes, and which, when formed as solids, are strong, tough and unaffected by water, acids or alkalis.

We have found that proteins may be reacted with an amine and an aldehyde to prepare new chemical compounds. One process involving a typical reaction is described as follows.

Animal glue formed in the usual way may be used as the starting material. The glue is prepared in aqueous solution containing enough water to prevent its setting in the subsequent mixing steps. Conveniently the solution may be prepared by soaking and heating the dry glue protein in water. To the aqueous glue there may be added an acid, suitably hydrochloric acid, and a primary aromatic amine such as aniline. The acid may be added in quantity to react with the amine in forming the amine salt such as aniline hydrochloride. Any acid capable of reacting with a primary aromatic amine to form a salt, may be used. For convenience we may call such an acid an amine salt forming acid. Suitable acids other than hydrochloric acid are acetic acid and sulphuric acid. The amine is used in an amount of about 50% of the protein starting material but more or less may be employed. The amount of the amine may vary from about 10% to 95% of the protein material, and, in general, the water resistance of the final product is increased as greater proportions of the amine are employed.

The acid may be added to the warm glue solution, and the mixture cooled to about room temperature before the amine and aldehyde are added so as to control the speed of the reaction somewhat. The reaction of the amine and acid is allowed to proceed and usually is complete in about a half hour. The mixture sets to a jell which is mascerated and suspended in water. Then an alkali is added in sufficient amount to react with the amino-protein complex to form a salt with the negative portion of the acid radical. For example, sodium carbonate may be added in sufficient quantity to take up the chlorine of the hydrochloric acid radical in the formation of sodium chloride. Preferably, an excess of the alkali is used, bringing the pH to about 9 or 10 to insure complete reaction. It is better to use a mild alkali as sodium carbonate but other alkalis such as sodium hydroxide may also be used at slight disadvantage.

The mixture thus formed is washed with water to remove the salt formed by the reaction of the alkali, and then may be dried. The dried product can be pulverized in a mill and can be molded as a plastic or used for other purposes. In the molding operation the pulverized material may be introduced into a forming mold and subjected in the mold to heat and pressure to produce a setting of the plastic, and the molded article cooled and removed from the mold. Temperatures of 175° C. and pressures of 4,000 pounds per square inch are suitable. The resulting formed article is hard, tough and has high water resistance.

Instead of the glue starting material mentioned in the above description, we can use other proteins from animal sources such as keratin which is commercially obtained in the form of hoof meal, albumin and globulin found in animal blood, and collagen found in gristle, skin scraps, etc. To somewhat lesser advantage we can use the vegetable proteins such as those found in soybeans, peanuts and cashew nuts. The amine employed in our process may be any primary aromatic amine. Of the primary aromatic compounds which may be used we may mention by way of example aminophenol, o-toluidine, p-toluidine, benzidine and 4-amino-m-xylidine. The protein derivatives formed by the use of the aniline are of particular importance.

The aldehydes used in the process may be of various specific types. Some of those applicable are formaldehyde, crotonaldehyde, aldol, benzaldehyde and acrolein. The derivatives prepared using formaldehyde are of particular value.

Example I 100 gms. of glue are soaked in 1000 cc. of water until the glue has swelled. The mixture is heated on the steam bath with stirring until in solution. 65 cc. muriatic acid are mixed in and the solution cooled to 25° C. 50 cc. of aniline are stirred in followed by 80 cc. of 40% formaldehyde. The reaction is allowed to proceed and is usually complete in 30 minutes. The reacted mass will set to a jell which is macerated and suspended in a solution of 100 gms. of sodium carbonate in 2000 cc. of water. Neutralization is allowed to proceed over night, the precipitate strained off and washed in two changes of water to remove inorganic salts. After drying at 105° C. and pulverizing, the resin can be molded by compression at 4000–6000 lbs. per square inch and a temperature of 165–175° C.

Example II 100 gms. dried whole blood is put into solution with 2000 cc. of water. 97.5 cc. muriatic acid are added followed by 75 cc. of aniline and 120 cc. of 40% formaldehyde. The mixture is heated to 85–90° C. with occasional stirring. The hot reacted solution is poured into a solution of 100 gms. of sodium carbonate in water with stirring. The resin forms a granular precipitate which is filtered, washed twice in water and dried at 105° C. After pulverizing it can be compression molded at 4000–6000 lbs. pressure at a temperature of 165–175° C.

Example III 100 gms. of powdered hoof or horn are soaked in 1000 cc. of hot water for about one hour. 65 cc. of muriatic acid are cautiously added and the suspension cooled to 25° C. 50 cc. of aniline are added followed by 80 cc. of 40% formaldehyde. The reaction will complete itself in about 30 minutes. 100 gms. of sodium carbonate in 500 cc. of water are added with agitation and the precipitated resin filtered off. After two washings in water it is dried at 105° C. and pulverized. The powdered resin can be compression molded at 4000–6000 lbs. pressure and a temperature of 165–175° C.

We are unable to set forth the exact chemical structure of our new resin derivatives, since the structures of the proteins themselves are not known, and since we are not able to determine the extent and the type of linking and cross-linking that takes place in the reaction between protein, amine, acid, water, and aldehyde. However, it is apparent that the primary amino groups of the protein react in such a way that the new resin derivative contains the following characteristic structure:

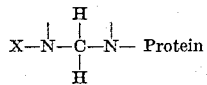

where X is a structure depending on the particular primary aromatic amine employed and "Protein" is a structure depending on the particular protein starting material used; and, further, it is probable that the secondary amino, or polyamide, groups are also involved with the aldehyde in a cross-linking reaction of an undetermined character.

As indicated above, the protein, water, acid, amine, and aldehyde all take part in a chemical interchange which results in a new chemical compound and not merely a mixture. That such is the case is supported by the following sets of factual evidence which we have assembled.

When ordinary mixtures of proteins and plastics are immersed in water for a period of 24 hours, it is normally found that they have absorbed about 22.5% water. In the same period of time, a phenol plastic (without protein) takes up 1 to 4% water. The protein resin derivative of the present invention absorbs 0.75 to 1.5% water in 24 hours, thus indicating that the protein has become chemically combined with the resin.

It is known that a single aniline-formaldehyde resin dissolves easily in excess aniline and may be precipitated therefrom by the addition of acetone; but when the protein resin derivative of the present invention is placed in aniline, none of its dissolves, thus indicating that the simple resin has undergone a chemical change by reacting with the protein.

When deaminized protein (protein from which the primary amine groups have been removed by treatment with nitrous acid) is used in the present process, no reaction between the protein and the aldehyde-amine resin takes place. The final product is merely a mixture which displays none of the desirable properties characteristic of our new protein resin reaction product. This is an indication that the presence of a substantial number of free primary amino groups in the protein is essential to start the linking and cross-linking reaction which occurs in the present process. Other completely or almost completely deaminized proteins have been tried in the present process without success. For example, leather, which is a tanned protein, has been tried but fails to combine chemically with the aldehyde-amine resin. The tanning of leather involves tying up all, or substantially all, the free primary amino groups of the protein. An essential characteristic of the protein to be used in our process is that it must contain a substantial number of free primary amino groups.

The chemical characteristics of the new protein resin derivatives have been further explored by studying their reaction to the biuret test. All free proteins, when treated with sodium hydroxide and copper sulfate in water give a violet coloration to the solution. This constitutes a positive indication that free, unreacted protein is present and is known as the "biuret test." For the purpose of this specification, we shall refer to a "positive biuret test" as one in which the addition of sodium hydroxide and copper sulfate to an aqueous solution results in a violet coloration; and we shall refer to a "negative biuret test" as one in which no violet coloration of the solution results.

Each of the new compositions of matter covered by the present invention give a negative biuret test when treated with sodium hydroxide and copper sulfate, thus indicating that the composition is a completely reacted chemical compound which contains no free, unreacted protein.

Example IV

A small amount of an ordinary aniline-formaldehyde resin is mixed with a small amount of glue protein, and the mixture is placed in a test tube. Water is next added, followed by a sodium hydroxide solution, and then one of copper sulfate. The contents of the tube are mixed by shaking and allowed to settle for one hour. By this time the top liquid in the test tube is a deep violet color. This constitutes a positive biuret test, denoting the presence of free protein.

Example V

The glue-aniline-formaldehyde product of Example I was, before drying and pulverizing, subjected to the biuret test according to the procedure shown in Example IV. A negative biuret test was given.

The same product, after drying, pulverizing, and molding, was then tested and also gave a negative biuret test.

Example VI

The blood-aniline-formaldehyde product of Example II was, before drying and pulverizing, subjected to the biuret test according to the procedure shown in Example IV. A negative biuret test was given.

The same product, after drying, pulverizing, and molding, was then tested and also gave a negative biuret test.

Example VIII

The powdered hoof-aniline-formaldehyde product of Example III was, before drying and pulverizing, subjected to the biuret test according to the procedure shown in Example IV. A negative biuret test was given.

The same product, after drying, pulverizing, and molding, was then tested and also gave a negative biuret test.

The foregoing detailed description and examples have been given for the purpose of explanation only, and it is expected that our improvements may be practiced in widely different forms, all within the spirit of the invention.

This application is a continuation-in-part of our co-pending application Serial No. 533,948, filed May 3, 1944 and now abandoned.

What we claim, and desire to secure by Letters Patent is:

1. A process for preparing a resinous composition comprising reacting a protein which contains a substantial number of free amino groups with at least about 10% of a primary aromatic amine, an acid selected from the group consisting of mineral acids and acetic acid, and at least one mole of an aldehyde per each mole of primary aromatic amine employed, in the presence of water, to form a chemical complex which exhibits a substantially negative biuret test.

2. A process for preparing a resinous composition comprising reacting a protein which contains a substantial number of free amino groups with at least about 10% of aniline, an acid selected from the group consisting of mineral acids and acetic acid, and at least one mole of an aldehyde per each mole of aniline employed, in the presence of water, to form a chemical complex which exhibits a substantially negative biuret test.

3. A process for preparing a resinous composition comprising reacting a protein which contains a substantial number of free amino groups with at least about 10% of a primary aromatic amine, an acid selected from the group consisting of mineral acids and acetic acid, and at least one mole of formaldehyde per each mole of primary aromatic amine employed, in the presence of water, to form a chemical complex which exhibits a substantially negative biuret test.

4. A process for preparing a resinous composition comprising reacting a protein which contains a substantial number of free amino groups with at least about 10% of a primary aromatic amine, hydrochloric acid, and at least one mole of an aldehyde per each mole of primary aromatic amine employed, in the presence of water, to form a chemical complex which exhibits a substantially negative biuret test.

5. A process for preparing a resinous compound comprising reacting glue with at least about 10% of aniline, hydrochloric acid, and at least one mole of formaldehyde per each mole of aniline employed, in the presence of water, to form a chemical complex which exhibits a substantially negative biuret test.

6. A process for preparing a resinous compound comprising reacting keratin with at least about 10% of aniline, hydrochloric acid, and at least one mole of formaldehyde per each mole of aniline employed, in the presence of water, to form a chemical complex which exhibits a substantially negative biuret test, 7. A process for preparing a resinous compound comprising reacting blood with at least about 10% of aniline, hydrochloric acid, and at least one mole of formaldehyde per each mole of aniline employed, in the presence of water, to form a chemical complex which exhibits a substantially negative biuret test.

8. A process for preparing a resinous compound comprising reacting albumin with at least about 10% of aniline, hydrochloric acid, and at least one mole of formaldehyde per each mole of aniline employed, in the presence of water, to form a chemical complex which exhibits a substantially negative biuret test.

9. A process for preparing a resinous composition comprising reacting a protein which contains a substantial number of free amino groups with at least about 10% of a primary aromatic amine, an acid selected from the group consisting of mineral acids and acetic acid, and at least one mole of an aldehyde per each mole of primary aromatic amine employed, in the presence of water, to form a chemical complex which exhibits a substantially negative biuret test, reacting an alkali with said complex to form a salt including the anion of said complex, and washing the resulting mixture to remove said salt therefrom.

10. A process for preparing a resinous composition comprising reacting a protein which contains a substantial number of free amino groups with at least about 10% of a primary aromatic amine, an acid selected from the group consisting of mineral acids and acetic acid, and at least one mole of an aldehyde per each mole of primary aromatic amine employed, in the presence of water, to form a chemical complex which exhibits a substantially negative biuret test, reacting an alkali with said complex to form a salt including the anion of said complex, washing the resulting mixture to remove said salt therefrom, and drying the washed material and pulverizing same.

11. The product prepared in accordance with the process of claim 1.

12. The product prepared in accordance with the process of claim 5.

13. The product prepared in accordance with the process of claim 6.

14. The product prepared in accordance with the process of claim 7.

15. The product prepared in accordance with the process of claim 8.

GEORGE C. STOECKER.
HAVARD L. KEIL.

REFERENCES CITED

The following references are of record in the file of this patent:

UNITED STATES PATENTS

| Number | Name | Date |
|---|---|---|
| 952,724 | Berend | Mar. 22, 1910 |
| 1,245,979 | Satow | Nov. 6, 1917 |
| 1,939,691 | Haller et al. | Dec. 19, 1933 |

FOREIGN PATENTS

| Number | Country | Date |
|---|---|---|
| 4,154 | Great Britain | A. D. 1909 accepted Dec. 9, 1909 |
| 527,894 | Great Britain | Oct. 17, 1940 |
| 54,729 | Netherlands | June 15, 1943 |

OTHER REFERENCES

Beilstein's Handbuch der Organishen Chemie, 4th Ed., vol. 12, page 120, (Copy in Scie. Libr.)